March 12, 1940.  L. S. WILLIAMS  2,193,660
COUNTING SCALE
Filed Aug. 17, 1938  4 Sheets-Sheet 1
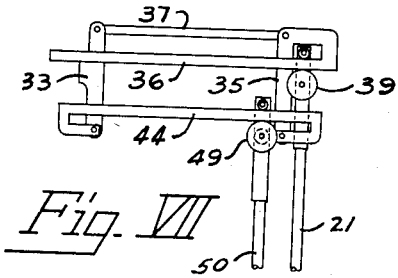
Fig. VII
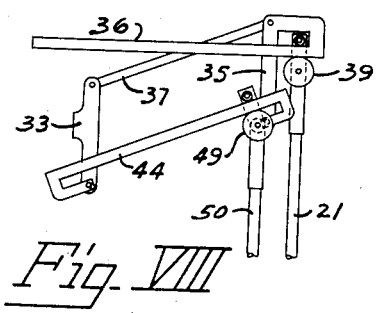
Fig. VIII
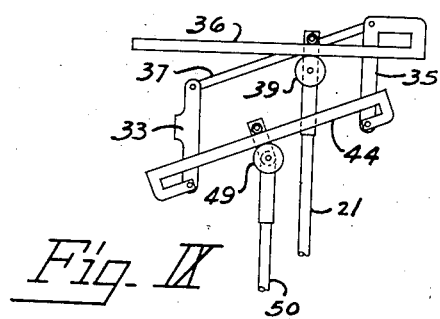
Fig. IX
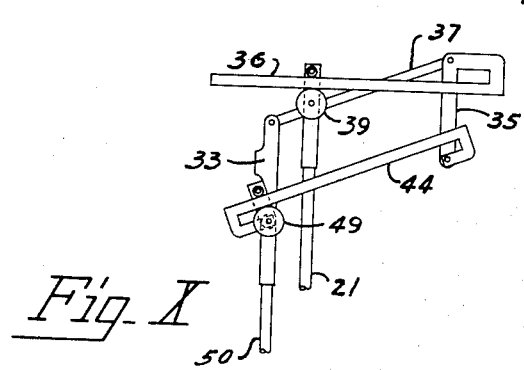
Fig. X
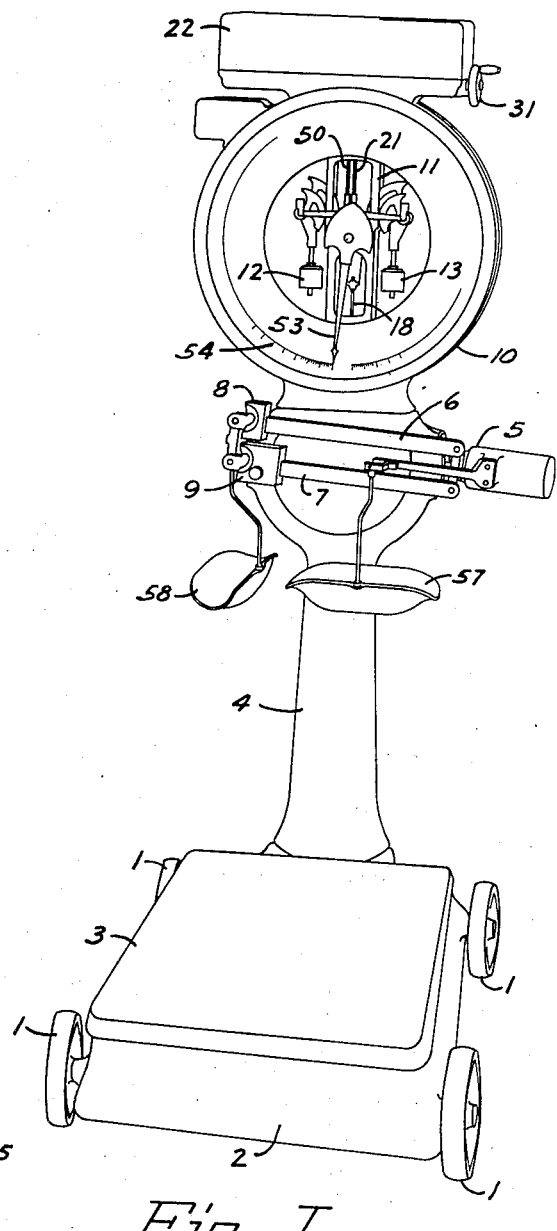
Fig. I
Lawrence S. Williams
INVENTOR
BY Marshall & Marshall
ATTORNEYS

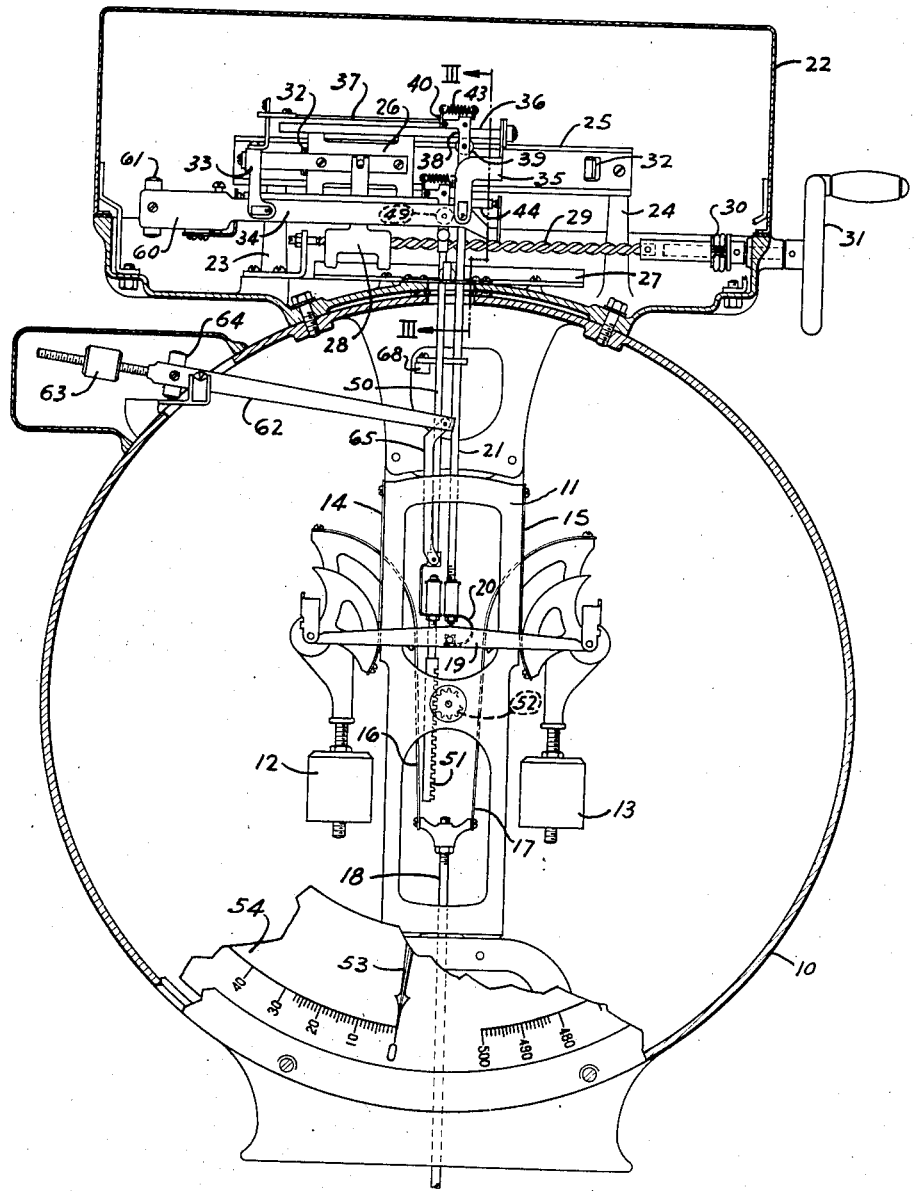
Fig. II
Lawrence S. Williams
INVENTOR

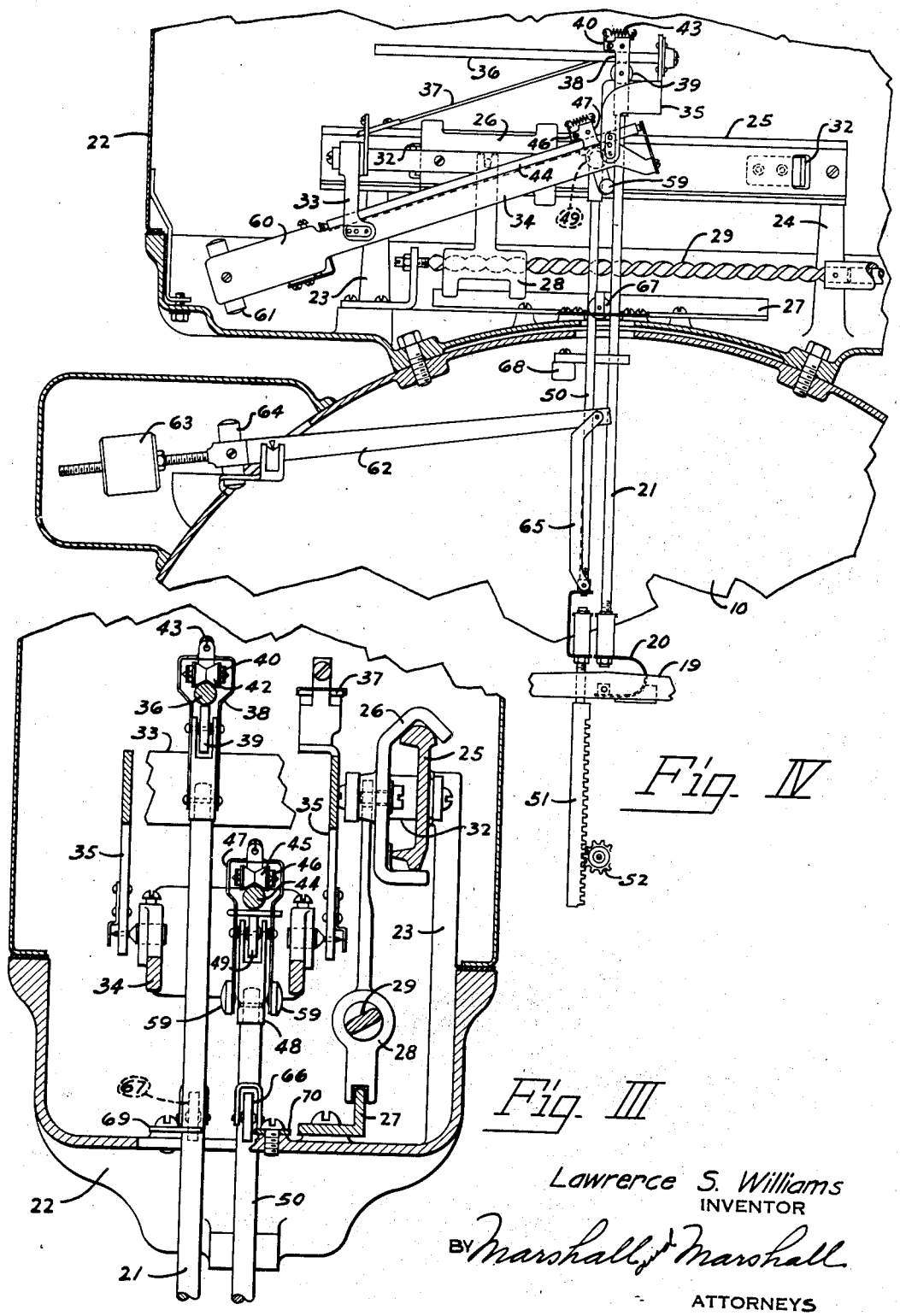
March 12, 1940. L. S. WILLIAMS 2,193,660
COUNTING SCALE
Filed Aug. 17, 1938  4 Sheets-Sheet 3
Fig. IV
Fig. III
Lawrence S. Williams
INVENTOR
BY Marshall & Marshall
ATTORNEYS March 12, 1940.                L. S. WILLIAMS                2,193,660
                              COUNTING SCALE
                      Filed Aug. 17, 1938          4 Sheets-Sheet 4
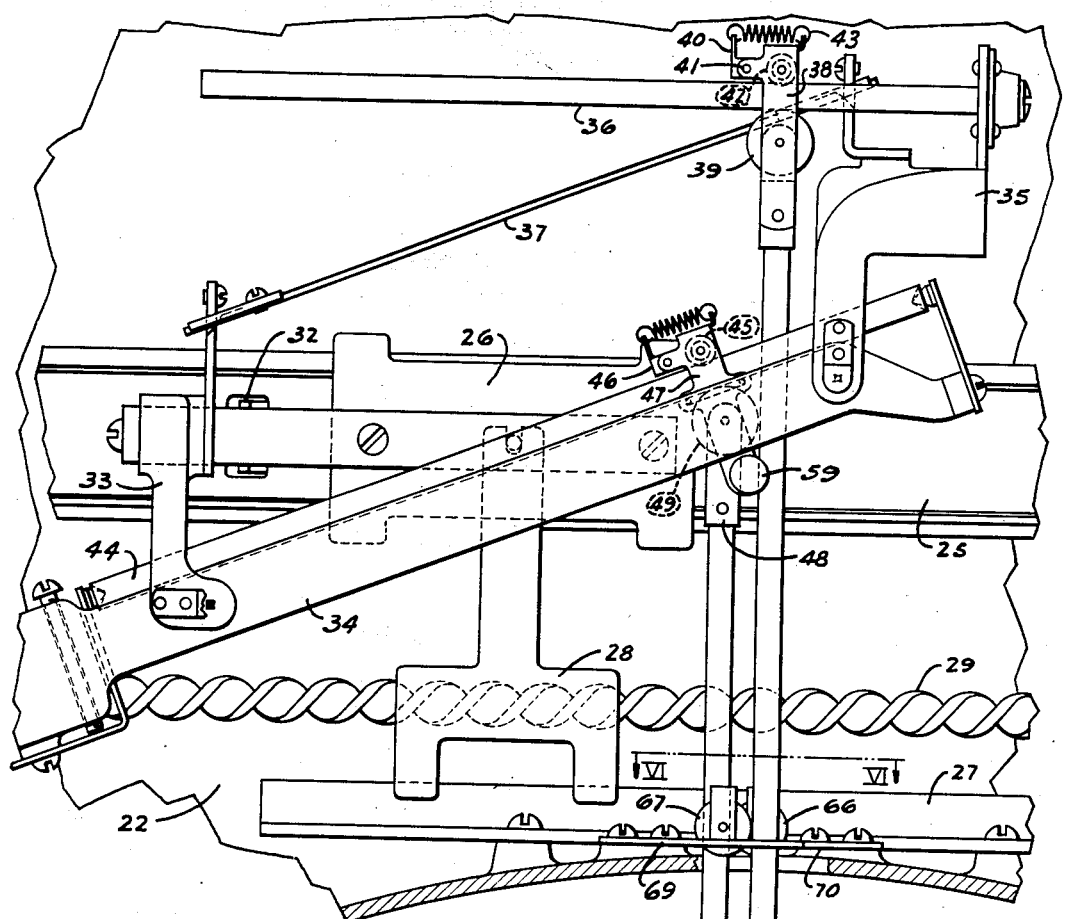
Fig. V
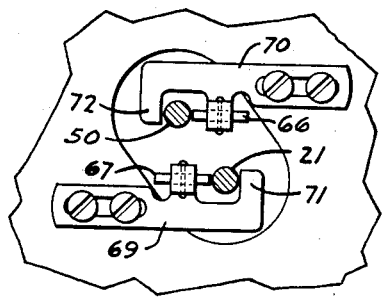
Fig. VI
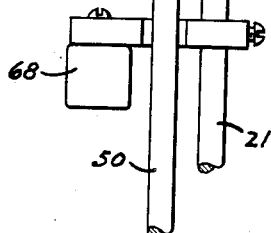
Lawrence S. Williams
INVENTOR
BY Marshall & Marshall
ATTORNEYS Patented Mar. 12, 1940

2,193,660

UNITED STATES PATENT OFFICE 2,193,660

COUNTING SCALE

Lawrence S. Williams, Toledo, Ohio, assignor to Toledo Scale Manufacturing Company, Toledo, Ohio, a corporation of New Jersey Application August 17, 1938, Serial No. 225,445

11 Claims. (Cl. 265—37)

This invention relates to counting scales, and particularly to so-called automatic direct reading counting scales having indicators which are brought into registration with indicia directly indicative of the numbers of pieces or articles which have been placed upon the commodity receivers of the scales.

One of the principal objects of the invention is the provision of a direct reading counting scale the mechanism of which may be set by a simple manual operation to indicate directly the number of pieces in a load on the scale.

Another object is the provision of a direct reading counting scale having a wide range of weighing capacities and capable of indicating counts of pieces throughout a wide range of individual weights per piece.

Another object is the provision of a direct reading counting scale capable of being set quickly in accordance with counts of relatively few specimens and thereafter capable of automatically indicating the counts of relatively great numbers of specimens.

Still another object is the provision of a direct reading scale capable of both weighing and counting with a high degree of accuracy.

And still another object is the provision of a direct reading counting scale capable both of instantly indicating the number of pieces or articles in any lot within the capacity of the scale and of rapidly counting out requisite numbers of pieces.

Other objects and advantages will be apparent from the following description, in which reference is had to the accompanying drawings illustrating a preferred embodiment of my invention and wherein similar reference numerals designate similar parts throughout the several views.

In the drawings:

Fig. I is a view in perspective of a portable direct reading counting scale embodying my invention;

Fig. II is an enlarged front elevational view showing the automatic load-counterbalancing mechanism of the scale and the mechanism by means of which counting operations may be performed, the indicating mechanism being partly broken away and the housing being partly in section;

Fig. III is a further enlarged fragmentary sectional view taken substantially on the line III—III of Fig. II;

Fig. IV is an enlarged fragmentary front elevational view showing the indicator movement varying mechanism illustrated in Fig. II, the parts being shown in the positions assumed by them when the scale is under load, part of the housing being shown in section;

Fig. V is a fragmentary front elevational view, enlarged to the same extent as Fig. III, showing some of the mechanism illustrated in Fig. IV in greater detail;

Fig. VI is a fragmentary sectional plan view taken on the line VI—VI of Fig. V;

Fig. VII is a diagrammatic front elevational view showing the positions taken by the principal members of the mechanism illustrated in Fig. V when the scale is not under load;

Fig. VIII is a diagrammatic front elevational view showing the positions assumed by the principal members of the mechanism illustrated in Fig. V when the scale is under load and the indicator movement varying mechanism is set for maximum indicator movement;

Fig. IX is a diagrammatic front elevational view showing the positions assumed by such principal members when the scale is under the same load as in Fig. VIII but the indicator movement varying mechanism has been moved to an intermediate position; and Fig. X is a diagrammatic front elevational view showing the positions assumed by such principal members when the scale is under load and the indicator movement varying mechanism has been so set that the indicator remains stationary.

Referring to the drawings in detail, the weighing scale depicted in Fig. I is supported on wheels 1 at the four corners of a base housing 2 within which are mounted load-supporting levers (not shown) that carry a commodity-receiving platform 3. Surmounting the base housing 2 at its rear end is an upright hollow column 4 upon which is pivotally mounted a beam lever 5, the beam lever 5 being suitably connected, by means of a rod (not shown) that extends through the hollow column 4, to the platform supporting levers. The beam lever 5 carries beams 6 and 7 equipped with poises 8 and 9 for counterbalancing tare.

Fixed upon the upper end of the column 4 is a dial housing 10 within which is secured a frame 11. A pair of load-counterbalancing pendulums 12 and 13 are hung from the frame 11 by means of ribbons 14 and 15 and are connected, by means of ribbons 16 and 17 and a rod 18, to the beam lever 5. When a load is placed upon the platform 3, the pendulums 12 and 13 swing outwardly and upwardly until they reach a position in which they counterbalance the load.

The scale structure so far described is not per se of my invention, and since it is well known and is illustrated and described in detail in U. S. Patent No. 1,543,768, to Halvor O. Hem, I have illustrated and described it herein in such detail only as will suffice to show the connection of my improvement therewith.

Pivotally connected to the pendulums 12 and 13, at points which move vertically upwardly when a load is placed upon the platform 3, is a compensating bar 19, and connected by means of a shock absorbing connection 20 at the center of the compensating bar 19 is a rod 21 which extends upwardly through the top of the dial housing 10 into a gear casing 22.

Supported upon brackets 23 and 24 within the gear casing 22 is a horizontally extending track 25 upon which is slidably mounted a carriage 26. Lying below the track 25 is a horizontally extending rail 27 upon which is slidably mounted a pronged nut 28, two of the prongs of the nut 28 engaging the rail 27, the other prong being connected to the carriage 26. A worm 29 is threaded through the pronged nut 28 and is connected, by means of a friction clutch 30, to the rotatable axle of an exterior handwheel 31 located at the right end of the gear casing 22. When the handwheel 31 is turned the pronged nut 28 and the carriage 26 are moved together along the rail 27 and the track 25 until the carriage 26 engages one or the other of two motion limiting stops 32, whereupon, if the handwheel be turned further, destructive strains are prevented by slipping of the clutch 30 from being transmitted to the worm or carriage.

The carriage 26 includes a rigid bracket 33, to which is pivoted one end of a frame 34. The other end of the pivoted frame 34 pivotally supports a sine bar bracket 35, to which a horizontally extending round sine bar 36 is rigidly fixed. In order to keep the sine bar 36 horizontal during swinging movements of the pivoted frame 34, a check link 37 is pivotally connected to the carriage bracket 33 and the sine bar bracket 35 in parallelism with the pivoted frame 34.

A forked ferrule is affixed to the upper end of the rod 21 and equipped with a fitting 38 which embraces the round sine bar 36, and a roller 39 mounted in the ferrule engages the lower side of the round sine bar. A small bell crank lever 40 is pivoted, as at 41, to the fitting 38 and carries a grooved retaining roller 42 at the end of one of its arms, while a light retractile spring 43 is connected from the end of the other arm of the bell crank lever to the fitting 38 and serves to hold the retaining roller 42 and the roller 39 in engagement with the top and bottom of the round sine bar. Hence, when the pendulums 12 and 13 swing upwardly under the influence of a load on the scale, raising the compensating bar 19 and the rod 21, the round sine bar 36 is lifted and the pivoted frame 34 is tilted about its pivotal connection to the bracket 33 of the carriage 26.

Mounted on the pivoted frame 34 and extending parallel thereto is a round swingable bar or member 44, and engaging the top of the swingable bar 44 is a grooved retaining roller 45 mounted on a small bell crank lever 46 which is pivoted upon a fitting 47, the fitting in turn being pivoted to a forked ferrule 48 on the axis of a roller 49 which is mounted in the forked ferrule 48 and engages the lower side of the swingable bar 44.

The ferrule 48 is fixed to the upper end of a rack rod 50 which extends downwardly into the dial housing 10 and is connected at its lower end to a rack 51. The teeth of the rack 51 mesh with the teeth of the pinion 52 fixed to a shaft which carries an indicator 53. Hence, with the carriage in the position in which it is shown in Figs. II and IV, against the left stop 32, when the pendulums move upwardly and lift the horizontal sine bar 36, the pivoted frame 34 and the swingable bar 44 will swing upwardly and raise the rack rod 50 and the rack 51, thus turning the pinion 52 and causing the indicator 53 to swing clockwise.

The extent to which the indicator 53 swings clockwise for a given movement of the pendulums depends upon the position of the carriage 26. If the carriage 26 be moved by means of the handwheel 31 and worm 29 to its extreme right side position engaging the right stop 32, the axis of the roller 49 will coincide with the axis of the pivotal connection between the pivotal frame 34 and the carriage bracket 33, and no movement of the indicator 53 will result from lifting the sine bar 36. With the carriage 26 slightly at the left of its extreme right position, the indicator will swing through only a few degrees while the horizontal sine bar 36 is lifted from its lowermost to its uppermost position. The farther toward the left the carriage is located the greater will be the movement of the indicator hand 53 for a given movement of the horizontal sine bar.

Located behind the indicator 53 in the dial housing 10 is a chart 54 bearing a nearly complete circle of indicia indicative of weights and counts. The automatic load-counterbalancing mechanism is so constructed that in moving to counterbalance equal increments of load it will cause the indicator to swing through equal angles, and the markings on the chart are equally spaced. The mechanism is so proportioned and adjusted that with the carriage 26 in its extreme left position, the weight of any commodity placed upon the scale platform will be directly indicated by the indicator 53 moving into juxtaposition with the proper weight indicium.

If the lever mechanism of the scale be so proportioned and the weight of the pendulums such that a load of five hundred pounds placed upon the platform will swing the indicator from one end of the series of weight indicia to the other end of the series of weight indicia, the series will be marked with numerals ranging from zero to five hundred pounds. The capacity of the automatic weighing mechanism being five hundred pounds, if five pieces weighing one pound each are placed upon the platform with the carriage 26 in its extreme left position the indicator will move into registration with the mark designated by the numeral 5, while if fifty one-pound pieces are placed upon the platform the indicator will move into registration with the mark designated by the numeral 50. Thus, any quantity of one-pound pieces may be counted by placing them on the platform with the carriage 26 in its extreme left position.

If the parts to be counted should weigh more than one pound each, five of them placed upon the platform with the carriage in its extreme left position will cause the indicator to swing beyond the mark designated by the numeral 5. The handwheel 31 then may be turned to move the carriage to the right until the indicator moves backwardly sufficiently to bring its index line into registration with the mark designated by the numeral 5. Thereafter any quantity of like pieces placed upon the platform 3 will cause the indicator to move to a position in which its index line is in registration with the mark corresponding to the number of pieces on the platform.

In order that the scale may be usable for counting pieces weighing less than one pound, it is equipped with additional commodity pans 57 and 58 which are so supported by the beam lever 5 that a weight in the commodity pan 57 will cause the indicator 53 to move ten times as far as it would be caused to move by the same weight on the platform 3 and a weight in the commodity pan 58 will cause the indicator to move one hundred times as far as it would be caused to move by the same weight on the platform 3. Thus, with the carriage 26 in its extreme left position, fifty pieces weighing one-tenth pound each, if placed in the commodity pan 57 will cause the indicator 53 to move into registration with the mark designated by the numeral 50; and fifty pieces weighing one-hundredth of one pound, if placed in the commodity pan 58 also will cause the indicator to move to a position in registration with the mark designated by the numeral 50.

Pieces of medium weight—e. g., pieces weighing between one-tenth of a pound and one pound—can be counted by placing them in the commodity pan 57, in the same manner as heavier pieces can be counted by placing them upon the platform 3.

It is important, in setting the mechanism in accordance with the unit weights of specimens, that the setting be made with great accuracy. Therefore, it is preferable to place the specimens in the commodity pan 57 when the total weight of the lot to be counted is greater than fifty pounds and to place the specimens in the commodity pan 58 when the total weight of the lot to be counted is less than fifty pounds. If the parts to be counted weight over one pound each and the weight of the lot to be counted is greater than fifty pounds, the mechanism may be set by placing five specimens in the commodity pan 57 and moving the handwheel 31 until the indicator registers with the mark on the chart designated by the numeral 50. The specimens then may be removed from the commodity pan 57 and the entire lot to be counted placed upon the platform 3, whereupon the indicator will move into juxtaposition with a character on the chart having the numerical value of the actual count. If, for example, the indicator should move until its index line were in registration with the mark designated by the numeral 350, the number of pieces on the platform would be three hundred and fifty.

Similarly, large numbers of small articles ranging in weight from one-tenth of a pound to one pound each may be counted by placing five specimens in the commodity pan 58, setting the mechanism so that the indicator registers with the mark designated 50 and then placing the lot to be counted either in the commodity pan 57 on on the platform 3. When the mechanism has been set with the indicator pointing to a mark having a value ten times the number of specimens placed in the commodity pan 58 and the lot to be counted is placed in the commodity pan 57 the numerical count will be indicated directly but if the lot to be counted be placed upon the platform 3, the numerical value indicated by the indicator must be multiplied by ten.

If the specimens weigh less than one-tenth pound each it is better to use more than five of them in setting the scale. If fifty specimens be placed in the commondity pan 58 and the mechanism set with the indicator at the 50 mark, the indicated count of pieces in the pan 57 should be multiplied by ten and the indicated count of pieces on the platform should be multiplied by one hundred.

In order that errors may not be caused by the variable effect of the weight of the mechanism as it is lifted through variable distances by movement of the pendulum, the weight of the mechanism that is lifted is counterbalanced. The pivoted fitting 47 is provided with small counterbalance weights 59. A loading box 60, fixed to the pivoted frame 34, is weighted with enough metal to counterbalance the movable parts of the parallelogram formed by the pivoted frame 34, the check link 37 and the sine bar bracket 35, as well as the weight of the sine bar 36 and swingable bar 44.

In order that the center of mass of the assemblage supported by the pivoted frame 34 may be adjusted to be in the axis of pivotal movement of the frame, a perpendicularly adjustable weight 61 is incorporated with the loading box 60.

The mass of the rack rod 50 and the rack 51 is supported by a lever 62 having weights 63 and 64 adjustable perpendicularly to each other and located on the side of the lever fulcrum opposite to the connection from the lever to the rack rod 50.

The rack rod 50 is connected to the supporting lever 62 by means of a link 65 so biased as to hold the rack 51 in mesh with the pinion 52 and to hold the rack rod against a guiding roller 66 where the rack rod passes through the top of the dial housing 10. The rod 21 is also guided by a similar roller 67, against which it is held by the slight influence of a small weight 68. In order to prevent the rods 21 and 50 from being pushed away from the rollers when the carriage 26 is moved, brackets 69 and 70, in which the rollers 66 and 67 are mounted, are provided with guards 71 and 72 that are normally spaced a few thousandths of an inch from the rods and do not touch them during automatic weighing or counting movements.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, automatic load-counterbalancing mechanism mounted on said frame, a carriage shiftably mounted on said frame, a swingable bar carried by said carriage and swingable about an axis shiftable with said carriage, a sine bar, means whereby said sine bar is pivotally carried by said swingable bar, means for preventing said sine bar from tilting relatively to said frame, means for balancing the mass of said swingable bar and parts carried thereby, connecting means extending from said automatic load-counterbalancing mechanism and operatively engaging said sine bar, said sine bar being longitudinally movable with respect to the place of engagement of said connecting means therewith, an indicator, indicator operating means extending from said indicator and operatively engaging said swingable bar, means for offsetting the mass of said indicator operating means, said swingable bar being longitudinally movable with respect to the place of connection of said indicator operating means therewith, said indicator being movable by movement of said load-counterbalancing mechanism acting through said sine bar and said swingable bar, and means for positioning said carriage to vary the extent of movement of said indicator relatively to the extent of movement of said automatic load-counterbalancing mechanism.

2. In a device of the class described, in combination, a frame, automatic load-counterbalancing mechanism supported upon said frame, a horizontal straight track supported upon said frame, a carriage mounted on said track, a swingable bar pivotally carried by said carriage, a bracket pivoted to said swingable bar, a horizontal sine bar fixed to said bracket, means for maintaining the horizontal condition of said sine bar during swinging movements of said swingable bar, a vertically movable rod connecting said automatic load-counterbalancing mechanism to said sine bar, said sine bar being shiftable with respect to the place of connection of said vertically movable rod therewith, a vertically movable rack rod pivotally connected to said swingable bar, said swingable bar being shiftable to vary the place of connection of said vertically movable rack rod therewith, and means for moving said carriage along said track to vary the places of connection between said vertically movable rod and said sine bar and the places of connection between said vertically movable rack rod and said swingable bar.

3. In a device of the class described, in combination, a frame, automatic load-counterbalancing mechanism supported upon said frame, a horizontal track supported upon said frame, a carriage mounted upon said track, a swingable bar pivotally mounted upon said carriage, a bracket pivotally carried by said swingable bar, means for preventing said bracket from tilting during swinging movements of said swingable bar, means for offsetting the mass of said swingable bar and parts supported thereby, a vertically movable member connecting said automatic load-counterbalancing mechanism to said bracket, a vertically movable rack rod, means for offsetting the mass of said rack rod and parts supported thereby, a pivotal connection between said vertically movable rack rod and said swingable bar, said pivotal connection being engageable with said swingable bar at various locations along said swingable bar, and means for moving said carriage along said track and thereby adjusting the place of engagement of said pivotal connection with said swingable bar.

4. In a device of the class described, in combination, a frame, automatic load-counterbalancing mechanism supported upon said frame, a horizontal track supported upon said frame, a carriage mounted upon said track, a swingable bar pivotally mounted upon said carriage, a bracket pivotally carried by said swingable bar, means for preventing said bracket from tilting during swinging movements of said swingable bar, a vertically movable member connecting said automatic load-counterbalancing mechanism to said bracket, a vertically movable rack rod, a pivotal connection between said vertically movable rack and said swingable bar, said pivotal connection being engageable with said swingable bar at various locations along said swingable bar, and means for moving said carriage along said track and thereby adjusting the place of engagement of said pivotal connection with said swingable bar.

5. In a device of the class described, in combination, a frame, automatic load-counterbalancing mechanism supported upon said frame, a horizontal track supported upon said frame, a carriage mounted upon said track, a swingable bar pivotally mounted on said carriage, a vertically movable rod connecting said automatic load-counterbalancing mechanism to said swingable bar to swing said swingable bar through angles dependent upon movement of said automatic load-counterbalancing mechanism and independent of the position of said carriage on said track, a vertically movable rack rod, a pivotal connection between said vertically movable rack rod and said swingable bar, said pivotal connection being adjustable to various positions along said swingable bar, and means for moving said carriage along said track and thereby adjusting said pivotal connection to various positions along said swingable bar.

6. In a device of the class described, in combination, a frame, automatic load-counterbalancing mechanism supported upon said frame, a track supported upon said frame, a carriage mounted upon said track, a swingable member pivoted upon said carriage, means connecting said automatic load-counterbalancing mechanism to said swingable member to swing said swingable member through angles dependent upon movements of said load-counterbalancing mechanism and independent of the position of said carriage on said track, a rack, means pivotally connecting said rack to said swingable member, the place of connection of said rack to said swingable member being adjustable along a straight line on said swingable member, and means for moving said carriage along said track and thereby adjusting the place of pivotal connection between said rack and said swingable member to various locations.

7. In a device of the class described, in combination, a frame, automatic load-counterbalancing mechanism supported upon said frame, a fulcrum supported upon said frame and shiftable horizontally along a straight path thereon, a swingable member pivoted at said fulcrum, means for balancing the mass of said swingable member about said fulcrum, means connecting said automatic load-counterbalancing mechanism to said swingable member to swing said swingable member upwardly and downwardly through angles dependent upon movements of said load-counterbalancing mechanism and independent of the position of said fulcrum along its path on said frame, a vertically movable rack, connecting means pivotally connecting said rack to said swingable member, means for offsetting the mass of said rack and said connecting means, said connecting means being engageable with said swingable member in various positions along a straight line on said swingable member, and means for moving said fulcrum along its path on said frame and thereby adjusting the position of engagement of said connecting means with said swingable member to various locations along the straight line on said swingable member.

8. In a device of the class described, in combination, a frame, automatic load-counterbalancing mechanism supported upon said frame, a fulcrum supported upon said frame and shiftable horizontally along a straight path thereon, a swingable member pivoted at said fulcrum, means connecting said automatic load-counterbalancing mechanism to said swingable member to swing said swingable member upwardly and downwardly through angles dependent upon movements of said load-counterbalancing mechanism and independent of the position of said fulcrum along its path on said frame, a vertically movable rack, connecting means pivotally connecting said rack to said swingable member, said connecting means being engageable with said swingable member in various positions along a straight line on said swingable member, and means for moving said fulcrum along its path on said frame and thereby adjusting the position of engagement of said connecting means with said swingable member to various locations along the straight line on said swingable member.

9. In a device of the class described, in combination, a frame, automatic load-counterbalancing mechanism supported upon said frame, a fulcrum supported upon said frame and shiftable horizontally in a straight path thereon, a swingable member pivoted for up and down movement at said fulcrum, means connecting said automatic load-counterbalancing mechanism to said swingable member to swing said swingable member through angles dependent upon movements of said load-counterbalancing mechanism and independent of the position of said fulcrum along its path on said frame, indicator operating means, a pivotal connection between said indicator operating means and said swingable member, said pivotal connection being engageable with said swingable member in various positions along a straight line on said swingable member, and means for moving the fulcrum of said swingable member horizontally along its path on said frame and thereby adjusting said pivotal connection to various locations along the straight line on said swingable member.

10. In a device of the class described, in combination, a frame, automatic load-counterbalancing mechanism supported upon said frame, a fulcrum supported upon said frame and shiftable thereon in a straight path, a swingable member pivoted at said fulcrum, means for balancing the mass of said swingable member about said fulcrum, means connecting said automatic load-counterbalancing mechanism to said swingable member to swing said swingable member through angles dependent upon movements of said load-counterbalancing mechanism and independent of the position of said fulcrum along said path, indicator operating means, means for offsetting the mass of said indicator operating means, a pivotal connection between said indicator operating means and said swingable member, said pivotal connection being engageable with said swingable member at various positions along a straight line on said swingable member, and means for moving the fulcrum of said swingable member along its path on said frame and thereby causing said pivotal connection to engage said swingable member at various positions along said straight line.

11. In a device of the class described, in combination, a frame, automatic load-counterbalancing mechanism supported upon said frame, a fulcrum supported upon said frame and shiftable thereon in a straight path, a swingable member pivoted at said fulcrum, means connecting said automatic load-counterbalancing mechanism to said swingable member to swing said swingable member through angles dependent upon movements of said load-counterbalancing mechanism and independent of the position of said fulcrum along said path, indicator operating means, a pivotal connection between said indicator operating means and said swingable member, said pivotal connection being engageable with said swingable member at various positions along a straight line on said swingable member, and means for moving the fulcrum of said swingable member along its path on said frame and thereby causing said pivotal connection to engage said swingable member at various positions along said straight line.

LAWRENCE S. WILLIAMS.